UNITED STATES PATENT OFFICE.

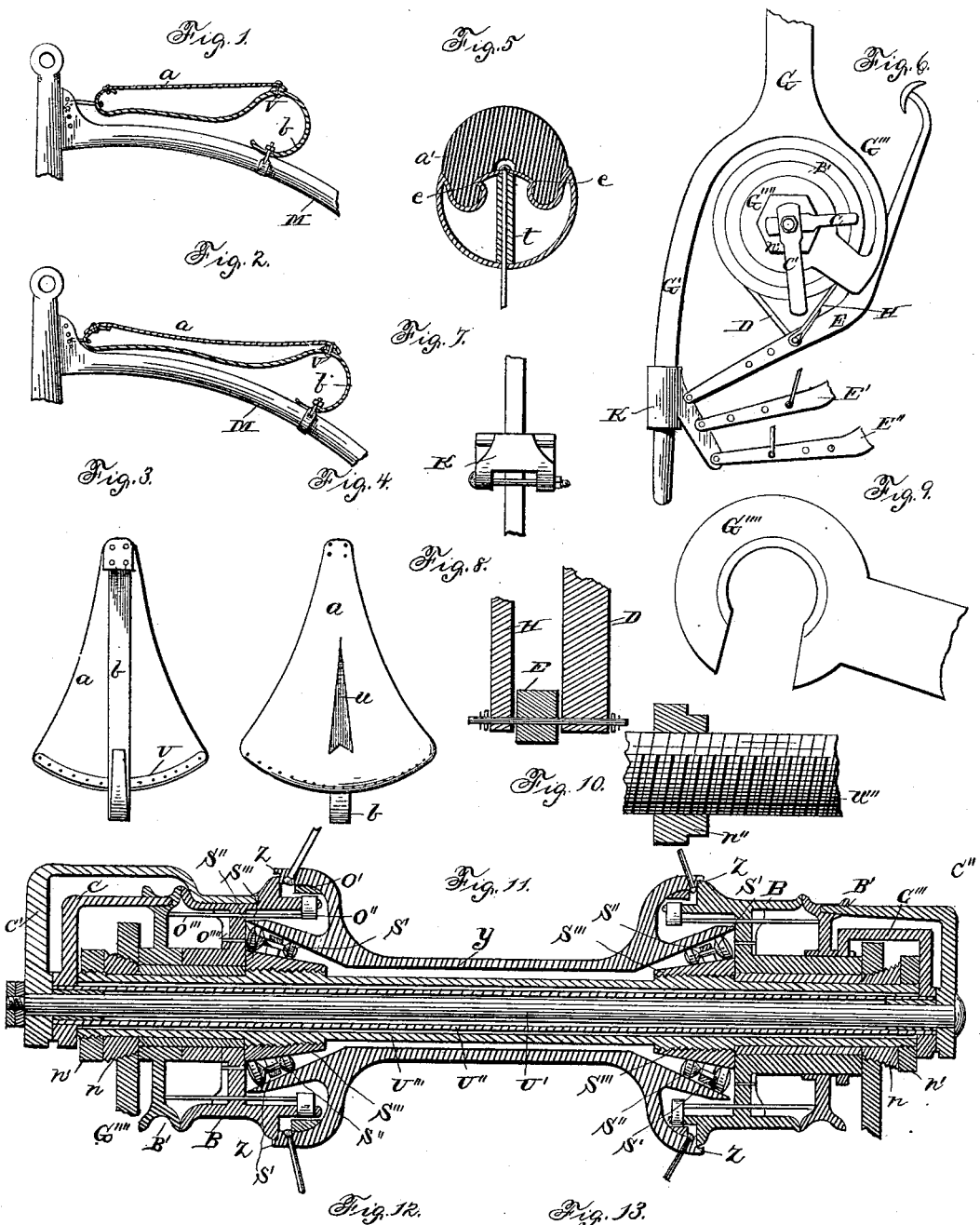

HOMER A. KING, OF SPRINGFIELD, MASSACHUSETTS, ASSIGNOR TO THE KING WHEEL COMPANY, OF NEW YORK, N. Y.

VELOCIPEDE.

SPECIFICATION forming part of Letters Patent No. 360,162, dated March 29, 1887.

Application filed October 2, 1886. Serial No. 215,158. (No model.)

*To all whom it may concern:*

Be it known that I, HOMER A. KING, a citizen of the United States, residing at Springfield, in the county of Hampden and State of Massachusetts, have invented new and useful Improvements in Velocipedes, which improvements are fully set forth in the following specification, the accompanying drawings making part of the specification.

My invention relates to an improved saddle for velocipedes; to an improved hollow felly-rim; to an improvement in adjusting the levers for power or speed or to adapt a bicycle to persons of different statures; to improvements in the anti-friction bearings, and to an improved method of inserting the axle, and are improvements on my former patents.

Referring to the drawings, similar letters of reference indicate corresponding parts.

Figure 1 is a side elevation sectional view of my improved saddle, the leather seat $a$ lapping over the front end of the spring $b$, and secured by rivets or otherwise, and the rear end of the leather seat secured to the cross $v$, which is riveted or otherwise secured to the spring $b$, which is fastened to the backbone M by the rear clip, as shown, and to the neck by a hook, by which the front end of the saddle can be depressed or elevated by hooking the front end on the rods lower or higher at the neck. The tension of the seat is increased by moving the clip farther back and tightening it, or the tension lessened by bringing the clip nearer to the front.

Fig. 2 is the same as Fig. 1, only the position of the spring is upon the backbone M in front.

Fig. 3 is a view of the saddle from beneath, showing the cross V, the spring $b$, and the leather seat $a$, and the rivets through the leather and metal at the rear end of the saddle.

Fig. 4 is a top or plan view of the saddle, showing the leather seat $a$, with the long opening $u$, the spring $b$, and the rivets through the leather at the front and rear ends of the saddle.

Fig. 5 is a view in cross-section of my improved hollow felly-rim made of one piece of weldless steel tubing, made by inserting a solid steel rod planed to the exact form the rim is to be made, and then both the rod and the tubing are drawn through dies until the final form is secured, with the projections $e$ on each side of the central elevation to hold the rubber tire in place without the use of cement. My rubber tire $a'$ of a former patent is shown with the concave opening above the center of the central elevation of the felly-rim. Holes are drilled through the elevation to insert the internally-threaded nut or nipple $t$ to, receive the spokes. The nipple or nut $t$ may be elliptical in cross section, and the hole in the elevation made to correspond, or any other form than round, to prevent them turning when the spokes are tightened by turning; but when the nipples pass through the rim far enough to be held by a spoke-grip the nipple may be round.

Fig. 6 is a side elevation view of the lower part of the front fork of my bicycle and the lever on one side in different positions, as E and E', with propelling strap D and retracing-strap H, secured by a rod driven into the lever E. (Shown in cross-section in Fig. 8.) There may be two or three rods driven in the lever E at the same distance apart as the distance between the holes in horizontal line in the fulcra K, so that three degrees of power or speed can be obtained by securing the end of the lever in the front one of the front holes in the fulcra for speed, as E, or in the rear, as E'', for power, or as a roadster in the central one of the holes in the horizontal line of holes in the fulcra, as E', and changing the junction of the straps, with the lever in each case to come directly under the center of the drums B' and B. When the bicycle is to be used by a short person, the levers are secured higher up, and when by a taller person lower down, on each side. The fulcrum-support G' may extend low, as shown, and be light and narrow all the way, and a perforated fulcra-support, K, be bolted to the support G' high up for a rider of small stature, or lower down for a tall person. The fork G is bifurcated over the pulley-drums. The front part, G', supports the fulcrum K, secured to G' adjustably, or it may be brazed on, or all made of one piece of metal. The rear part, G''', bends in a circle to the place where the retracing-strap leaves the pulley B', and then bends, to either hook onto the axle, as shown in Fig. 9, or a hole is drilled a trifle larger than the axle, as shown in Figs. 6 and 11, and with a screw-thread cut in the hole is secured to the axle by the inclined nut $n$. (Shown in Figs. 12 and 13.)

Fig. 7 is a view from the rear of one of the fulcrum-supports, and the perforated sides of the adjustable fulcrum K is secured by bolt to support G'.

Fig. 8 is a view in cross-section of lever E at the rod, to which the straps D and H are secured, with a loose steel tube between the leather and the rod to prevent wearing the leather. A washer and a split pin through the rod at each end hold the straps in place.

Fig. 9 is a view of the end of the rear part of the fork G when made to hook over the axle, with a rabbet on each side, into which nuts project and hold the hook G'''' from being lifted from its place, and also prevents its resting down upon the threads on the axle.

Fig. 10 is a sectional view of the nut $n''$, made to screw onto the axle U'''' and project into the side of the fork-head G''''.

Fig. 11 is a sectional view of the hub $y$, with dust-proof projections $z$, and the propelling-drum B and retracing-drum B' at each end, resting on the shaft or main axle U''', which, unlike as shown in Fig. 10, is here threaded only the width of one nut, $n'$, and need not be threaded at all if only the nuts $n$ are used, and the shafts U', U'', and U''' will be shortened. The central shaft, U', rigidly unites the connection $c'$ and drum B at the left with the connection $c''$ and retracing-drum B' at the right, and the hollow shaft U'' unites connection $c$ and retracing-drum B' at the left with the connection $c'''$ and the base of the propelling-drum B at the right. Thus by the depression of the lever E on the left, Fig. 6, the propelling-strap D turns the propelling-drum B, and this turns the connection $c'$ and central shaft, U', with the connection $c''$ and retracing-drum B' at the right, and its strap raises the lever E at the right, while the movement of the drums by the friction-rod $o'''$, held in the spring $o''''$, causes the ratchet-dogs $o''$ to engage the ratchet $o'$ on the side where the lever is descending and disengage them where the lever is rising. By moving the levers a little way in the opposite direction the dogs $o''$ are disengaged at both ends of the hub, and one can coast along as silently as though he were moving with runners on ice. The inclined collars S''' are internally threaded and screwed onto an externally-threaded collar, which is brazed onto the axle U''', but not too high to pass through the hub and opening in the fork at G'''', and the inclined rollers S'', with collars S', are adjusted, and a washer may be used, when necessary, between the fork and the tube, extending to the collar S''', to prevent its becoming loose and allowing the hub to crowd against the drums B and B'. By the improved construction of the connection C it can be inserted after the shaft or axle U'', and this, with the split nut $n$, makes the axle U'''' more easy of insertion. When the levers are raised with my patent beveled cog-wheels, only one shaft extends through the hub and two half-shafts, and only one drum is needed at each end of the hub and only one strap, and the gearing for power or speed is effected by changing the point of connection of the strap D with the lever without any change of the end of the lever in the fulcra.

Fig. 12 is an end view of the split nut $n$.
Fig. 13 is a side view of the split nut $n$.

Having thus described my invention, what I claim as new, and desire to secure by Letters Patent, is—

1. The saddle-spring $b$, bent in a curve upward at the front end and secured to the neck by a hook, and bent in a larger curve downward at the rear end, resting upon and secured to the backbone by a clip, the leather suspension-seat being attached in front to the spring and in the rear to the cross-support $v$, which is attached upon the rear curve of the spring, and the adjustment of the hoop and clip regulates the position and tension of the saddle, essentially as set forth.

2. A hollow felly-rim made from one piece of weldless steel tubing, with a central elevation in the rubber tire-bed, and projections on each side of the central elevation, substantially as and for the purpose set forth.

3. The fork G, bifurcated on each side on the drive-wheel, with prong G' and projection K, with means, substantially as described, for securing the end of the lever E in different positions to increase the power or speed.

4. The fork G, bifurcated on each side of the drive-wheel, with prong G' and projection K, with means, substantially as described, for securing the end of the lever E in a higher or lower position, to adapt the bicycle to men of different statures.

5. The hub $y$, with projections $z$, drums B and B', connections $c$, $c'$, $c''$, and $c'''$, shafts $u'$, $u''$, and $u'''$, and the anti-friction bearings S' S'', and the internal threaded inclined collar S''', all substantially as and for the purpose set forth.

6. The improved connection $c$, in combination with the internal-thread fork-prong G'''' and cone-shaped externally-threaded split nut $n$, whereby the axle and fork are more easily put and secured in position.

HOMER A. KING.

Witnesses:
FRANK H. BOWEN,
PAT MANNING.